US008464749B2

(12) United States Patent
Zeyfang

(10) Patent No.: US 8,464,749 B2
(45) **Date of Patent: *Jun. 18, 2013**

(54) GAS BOTTLE VALVE BODY PROTECTIVE DEVICE

(75) Inventor: Frederick W. Zeyfang, Erie, PA (US)

(73) Assignee: Protective Industries, Inc., Buffalo, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/929,373

(22) Filed: Jan. 19, 2011

(65) Prior Publication Data

US 2011/0210134 A1 Sep. 1, 2011

Related U.S. Application Data

(63) Continuation-in-part of application No. 11/996,729, filed as application No. PCT/US2007/078502 on Sep. 14, 2007, now Pat. No. 8,141,578, which is a continuation-in-part of application No. 11/522,542, filed on Sep. 15, 2006, now Pat. No. 7,681,587.

(51) Int. Cl.
*F16K 35/00* (2006.01)

(52) U.S. Cl.
USPC .......................................... 137/382; 220/724

(58) Field of Classification Search
USPC ............... 137/382, 383, 381; 220/724, 257.2, 220/270
See application file for complete search history.

(56) References Cited

U.S. PATENT DOCUMENTS 3,102,658 A 9/1963 Rosen
3,125,242 A 3/1964 Davis (Continued)

FOREIGN PATENT DOCUMENTS

FR 2828678 2/2003
GB 2301348 4/1996

(Continued)

OTHER PUBLICATIONS

Gas Cylinder Valve Protective Sleeve marketed by Alliance Plastics 2000-2005 (est).

(Continued)

*Primary Examiner* — Kevin Lee
*Assistant Examiner* — Macade Brown
(74) *Attorney, Agent, or Firm* — Hodgson Russ LLP

(57) ABSTRACT

A protective sleeve for gas bottle valve stems is provided comprised of an elongated tubular body configured to fit on a valve stem. At least one projection extends from an interior surface of the protective sleeve and is adapted to lockingly engage with at least one orifice in an opposing surface of the valve stem whereby the sleeve is prevented from being easily removed from the valve stem upon being placed thereover due to engagement of the projection with the orifice. A tear strip is provided within a side surface of the protective sleeve, whereby a portion of the protective sleeve may be removed to permit disengagement of the protective sleeve. A housing may be provided in the protective sleeve for storage of a washer which may be used to provide a seal between a regulator and the valve stem of the gas bottle. At least one flange extends laterally from the sleeve body and is configured to engage a thumb or finger of the user to assist in placing the protective sleeve upon the valve stem of the gas cylinder by application of downward force, the at least one flange positioned along the longitudinal extent of the protective sleeve between the ends of the protective sleeve.

52 Claims, 9 Drawing Sheets

U.S. PATENT DOCUMENTS

| | | | | |
|---|---|---|---|---|
| 3,587,654 | A | | 6/1971 | Yocum |
| 3,684,124 | A | | 8/1972 | Song |
| 4,095,713 | A | | 6/1978 | Norton |
| 4,616,763 | A | | 10/1986 | Ruhl |
| 4,630,638 | A | | 12/1986 | Hafner et al. |
| 4,645,087 | A | * | 2/1987 | Kusz ............................ 215/254 |
| 4,664,288 | A | | 5/1987 | Pereira et al. |
| 4,712,705 | A | | 12/1987 | Fuehrer |
| 4,729,488 | A | | 3/1988 | Bullock |
| 5,144,972 | A | | 9/1992 | Dryden |
| 5,191,992 | A | | 3/1993 | Darley |
| 5,397,012 | A | | 3/1995 | Tison et al. |
| 5,544,770 | A | | 8/1996 | Travisano |
| 5,909,827 | A | | 6/1999 | Bietzer et al. |
| 6,003,714 | A | | 12/1999 | Buermann |
| 6,286,702 | B1 | | 9/2001 | Buermann |
| 6,378,170 | B1 | | 4/2002 | Foucault et al. |
| D468,002 | S | | 12/2002 | Steffan |
| 6,854,616 | B2 | | 2/2005 | Steffan |
| D612,012 | S | | 3/2010 | Buermann |
| D612,013 | S | | 3/2010 | Buermann |
| 7,681,587 | B2 | | 3/2010 | Zeyfang |
| 2003/0127138 | A1 | | 7/2003 | Zinelli |
| 2003/0201266 | A1 | | 10/2003 | Steffan |

FOREIGN PATENT DOCUMENTS

| | | |
|---|---|---|
| WO | WO-97/29969 | 8/1997 |
| WO | WO 2004/085280 | 10/2004 |

OTHER PUBLICATIONS

Moss Gas Cylinder Valve Protector(est 1990) www.mossplastics.com/gas-cylinder-valve-protectors.

Written Opinion issued in WO 2008/034065.

Ratermann Manufacturing Company Medical Dust Cover Advertisement approx. Dec. 2007.

Ratermann Manufacturing Company on-line product catalog p. 8A-3 Medical Dust Cover with and without washer holder Sep. 2011.

Ratermann Manufacturing Company website Medical Dust Cover with and without washer holder Sep. 2011.

International Search Report WO 2008/034065.

Filtrona/Alliance Medical Post Valve Cap sold in 2003 (2003 catalog page and engineering drawings).

Moss Gas Cylinder Valve Protector (est. 1990) www.mossplastics.com/gas-cylinder-valve-protectors.

Moss Plastic Parts website Part 10787, “type 3”, gas valve protector drawing dated Nov. 24, 2009 (www.mossplastics.com).

Supplemental Joint Invalidity Appendix for U.S. Patent No. 7,681,587 of record in Civil Action 3:10-cv-01033 (U.S. Dist. Ct. MD Tenn).

Office Action dated Sep. 14, 2010 issued in Reexamination Proceeding U.S. Appl. No. 95/000,547.

Office Action dated Jan. 4, 2012 issued in Reexamination Proceeding U.S. Appl. No. 95/000,547.

Reexamination requester comments dated May 3, 2012 filed in Reexamination Proceeding U.S. Appl. No. 95/000,547.

Detendants’ Amended Answer and Counterclaims filed in Civil Action 3:10-cv-01033 (U.S. Dist. Court Middle Dist. of Tenn), Jul. 20, 2012.

Valve Shrink Wrap Protective Sleeve—Ratermann Manufacturing Catalog 2003.

Claim Construction Order issued in Civil Action 3:10-cv-01033 (U.S. Dist. Court Middle Dist. of Tenn), May 7, 2012.

Post-Claim Construction Order Joint Invalidity Appendix for U.S. Patent No. 7,681,587 for Civil Action 3:10-cv-01033 (US Dist Ct MD Tenn).

Reexamination requester comments dated Jan. 3, 2011 filed in Reexamination Proceeding U.S. Appl. No. 95/000,547.

* cited by examiner

GAS BOTTLE VALVE BODY PROTECTIVE DEVICE

This application is a continuation-in-part application of application Ser. No. 11/996,729, filed Jan. 24, 2008 now U.S. Pat. No. 8,141,578, which is a 35 U.S.C. 371 national stage application of PCT/US07/78502, filed Sep. 14, 2007, which is a continuation-in-part application of application Ser. No. 11/522,542, filed Sep. 15, 2006, now U.S. Pat. No. 7,681,587, issued Mar. 23, 2010.

BACKGROUND OF THE PRESENT INVENTION

The present invention is directed to a protective sleeve for use in connection with gas bottle post valves.

Gas bottles have a variety of end uses. Such end uses range from various industrial applications, where a specified gas is required (ranging from inert gases, such as nitrogen, to oxygen gas), to medical uses where oxygen is to be administered to a patient in need of oxygen. Such bottles have a tubular valve stem extending from an end of the gas bottle for engagement with a gas delivery tube or pipe.

A successful protective product for use with, for instance, the CGA 870 medical oxygen post (four sided elongated valve stem) should satisfy the following performance criteria: (a) prevent dust and debris from entering the oxygen supply port on the side of the valve stem, (b) be easy to install with a quick sliding motion, (c) remain firmly in place on the gas valve stem during handling, transportation, and storage before use by the gas user, and not prematurely rupture or become dislodged, (d) be easy for the end user to remove who is typically aged and/or infirmed, (e) serve to easily identify a full cylinder from an empty cylinder at a quick glance and at a distance of up to 50 feet, (f) provide "use evidence" (i.e., evidence that the compressed gas cylinder is still full, and has not previously been used), and (g) be translucent so that the valve seat sealing surface condition and valve pin index identifier can be inspected while the protective device is installed on the valve stem.

Such "use evidence" is particularly important because in emergency medical situations it is important for emergency personnel to be able to quickly identify which cylinder contains oxygen for use by a patient. "Use evidence" is also important to re-fillers of such compressed gas re-fillers, because full cylinders are frequently returned for credit when a full cylinder cannot be identified by content. This increases the re-filler's costs and affects the oxygen user's perception of value and quality provided by the re-filler.

It is also important that it be easy for the end user to remove the protective device from the valve stem. Many medical oxygen users are aged, and possibly also infirmed, individuals requiring home-based oxygen therapy. Any difficulty in removing the protective device could interfere with delivery of oxygen, or require assistance from another person if the protective device is not easily removed. An additional benefit sought for the protective device is the ability to physically protect the valve seat (the area between the bottom end of the protective device and the top of the compressed valve cylinder). Scratches and damage to the valve seat and post valve surface result in leak paths for oxygen to escape, which can result in explosion and/or fire.

The protective device must also address the needs of all who use or benefit from the protective device. Such parties include the compressed gas producers (who fill the gas bottles and initially install the protective device), the compressed gas distributors who receive the compressed gas bottles having the protective device, and the ultimate end users (home-based patients, hospitals, medical care personnel, etc.). Each level of distribution sometimes requires different attributes of the protective device. For instance, the compressed gas producer requires a protective device which is easy to install, is protective in nature, and locks into place. The distributor requires the protective device to be physically stable as installed, and not subject to being displaced from the valve stem during storage or transportation. The ultimate end users require the protective device to be physically stable as installed to provide "evidence of use" indication, and easy to remove. For example, some prior art devices with wrap-around locking means require the locking strap to be cut to remove the device.

Ease of installation has always been a problem with prior art valve stem protective devices. Shrink wrap devices require the device to be wet when applied, and also are required to dry or be dried by application of heat to cause the required shrinkage. Those with wrap-around locking straps are cumbersome to physically handle. Those which are four-sided band-like devices, as a result of their short length, may require finger pressure along the top of the device while at the same time running the fingers against the side of the valve stem. Due to the thin walls of the device, it is difficult to apply much downward pressure against the device with the installer's fingers. Also, due to the small contact area for the installer's fingers, the fingers will always rub against the side of the valve stem during installation. They may also require a special tool to install the device, or be heated to soften the device prior to installation.

The protective device most predominately used for the past 50 years is the elastic band protector described by U.S. Pat. No. 3,125,242 which has multiple shortcomings. Another widely used protective product used in the medical gas industry is the cellulose shrink wrap. The other products offered to the medical gas industry have deficiencies that limit their market acceptance. The "cellulose shrink wrap" product is basically an elongated wet cellulosic sleeve that slips over the valve stem, and is caused to shrink about the valve stem upon exposure to heat, or shrinks as it dries. The product has the disadvantage of requiring installers of the device to get their hands wet to install the device. The device additionally requires substantial time to dry and shrink at which time the cylinder and valve must be stationary. While this product provides a barrier to dust and dirt, it is not durable (it is subject to disintegration as the shrink wrap material is fragile) and provides no protection upon being struck. The cellulosic sleeve product also provides no inspection visibility of the valve seat and pin index condition as it is opaque, and it is often difficult for the end user to remove the shrunken sleeve prior to use. Further disadvantages include the shrink wrap prematurely dislodging if the cylinder is lifted by the valve stem (as commonly occurs in the industry), and the shrink wrap dislodging when exposed to moisture (as commonly occurs when shipped in open truck beds exposed to weather, rain and snow. The main advantage of this product is its low cost.

Several prior art gas valve protective products exist, including cellulose bands and shrink wrap, and those described by U.S. Pat. No. 5,397,012, U.S. Pat. No. 3,125,242, and U.S. Pat. No. 6,003,714. Each of these products provide certain benefits, but none provide all of the desired benefits. The device of U.S. Pat. No. 5,397,012 is essentially the same as that of U.S. Pat. No. 3,125,242 with the exception that the device is cut, opened, and has a ratchet locking mechanism. The device of U.S. Pat. No. 5,397,012 appears to have been developed in an attempt to improve on the installation shortcomings of the device of U.S. Pat. No. 3,125,242 which requires tools and/or other installation aids and requires substantial downward force for installation. However, in actual practice the device of U.S. Pat. No. 5,397,012 becomes very cumbersome to install by requiring two hands to pre-fold each corner of the device before assembly. The device additionally requires special attention to position on the valve post, while finding, orienting, positioning, and threading the ratchet tab into the ratchet locking mechanism at the back of the valve requires further focused attention by the installer. Because of the device's requirement to wrap around the valve post, the ratchet lock and tab become angled at an unnatural orientation requiring further installation care.

The product described by U.S. Pat. No. 5,397,012 is not easy to place on the valve stem and lock in place due to the small size of the locking strap. The locking strap, when locked into place, must also be cut or broken for the device to be removed from the valve stem. The product is also so small that it is difficult to determine from any distance the status (filled, unfilled) of the gas cylinder upon which it is placed. The thin strap can easily rupture and prematurely fall off if bumped in handling and transit. This device additionally requires two hands and substantial care and time to install.

The device described by U.S. Pat. No. 3,125,242 consists of a flexible band that is snug-fit onto the valve stem. As it is such a snug-fit on the valve stem, the band must either be softened in hot water to permit the band to be stretched over the valve stem, or a special tool must be used to assist in sliding the band over and onto the valve stem. A representative tool 16 is described at FIG. 1 of the U.S. Pat. No. 3,125,242. As described by the patent at column 3, lines 35-73, the band is placed around the circumference of the tool body, the tool body placed into engagement with the valve stem, and the band pushed off the tool body into snug engagement with the valve stem. This protective product is thus not easy to install upon the valve stem.

The protective device described by U.S. Pat. No. 6,003,714 is even more cumbersome than the protective device of U.S. Pat. No. 3,125,242. The device of this patent must be wrapped around the valve stem in covering position to the gas orifice, with one free end being locked into a locking mechanism of the other free end to maintain the device in place. The fact that this protective device is able to be wrapped around the valve stem (instead of being pulled over) attempts to solve the main problem with the protective device of U.S. Pat. No. 3,125,242, which is ease of installation. However, this solution is only partially successful, as the fact that one free end must be placed into the locking mechanism at the other end and pulled tight for locking purposes requires some dexterity and extra effort. This is a significant problem when these protective devices are placed on large numbers of compressed gas cylinder valve stems in an assembly line type of environment due to the manual labor involved. This type of protective device is also difficult to secure tightly around the valve body and is prone to becoming accidentally dislodged during normal handling.

Moss Plastic Parts, Ltd. sells a band-like gas cylinder valve "Type 3" protector which suffers from some of the same disadvantages as other prior art valve stem protectors, such as being band-like, and lacking the requisite flange(s). The Moss "Type 3" protector has corner configurations which permit the device to expand as needed, and as a result has a dimensionally unstable fit which results in an unreliable assembly onto the valve stem, and only has a single tear line along the corner of the device, which, together with the band-like design of the product, makes the product difficult to remove from engagement with the valve stem.

Thus, for over 50 years, despite the problems with prior art valve stem protective devices, no new product has been introduced prior to the inventor's patented product of U.S. Pat. No. 7,681,587 and the present invention which satisfactorily meets all of the criteria desired to be met for the protective product to be considered totally successful. Users want a single handed quick installation, easy low force, reliable gas valve stem protector.

A need accordingly exists for means by which a gas bottle may be modified to clarify whether gas has been delivered by the bottle, or whether the bottle is unused, and which does not suffer from any of the disadvantages suffered by conventional devices.

OBJECTS AND SUMMARY OF THE INVENTION

It is accordingly an object of the present invention to provide a protective sleeve for use with gas bottle post valve stems.

It is further an object of the present invention to provide a protective sleeve that will serve to seal an orifice in a post valve stem of a gas bottle.

It is further an object of the present invention to provide a protective sleeve that can be easily placed in locking engagement with a post valve stem of a gas bottle.

It is further an object of the present invention to provide a protective sleeve that may be easily engaged and easy to remove, while remaining in secure protective engagement with the valve stem during use.

Accordingly, there is thus provided a protective sleeve for use in connection with four-sided valve stems for gas bottles, with the protective sleeve comprised of an elongated four-sided unitary molded tubular body of such length as to extend along at least a portion of the length of the valve stem, at least one outwardly extending projection extending from an interior surface of the protective sleeve and adapted to physically engage with at least one orifice in an opposing surface of the valve stem in locking engagement therewith, whereby said protective sleeve is prevented from being easily removed from the valve stem upon being placed thereover due to locking engagement of the at least one projection with the at least one orifice; a tear strip provided within at least a portion of a side surface of the protective sleeve defined by opposing tear lines, whereby at least a portion of the side surface of the protective sleeve may be removed by tearing the tear strip so as to permit disengagement and removal of the protective sleeve from the valve stem. The protective sleeve optionally may include a washer housing, with the washer housing optionally including means to mount or retain a washer within the housing, and optionally attached to the tear strip as a grip member. The protective sleeve also includes at least one flange extending laterally from the sleeve body and configured to engage a thumb or finger of the user to assist in placing the protective sleeve upon the valve stem of the gas cylinder. Preferably, the protective sleeve includes only two flanges on opposing sides of the sleeve, with the at least one projection being on an intermediate side of the sleeve.

DETAILED DESCRIPTION OF THE INVENTION

Figure 1:
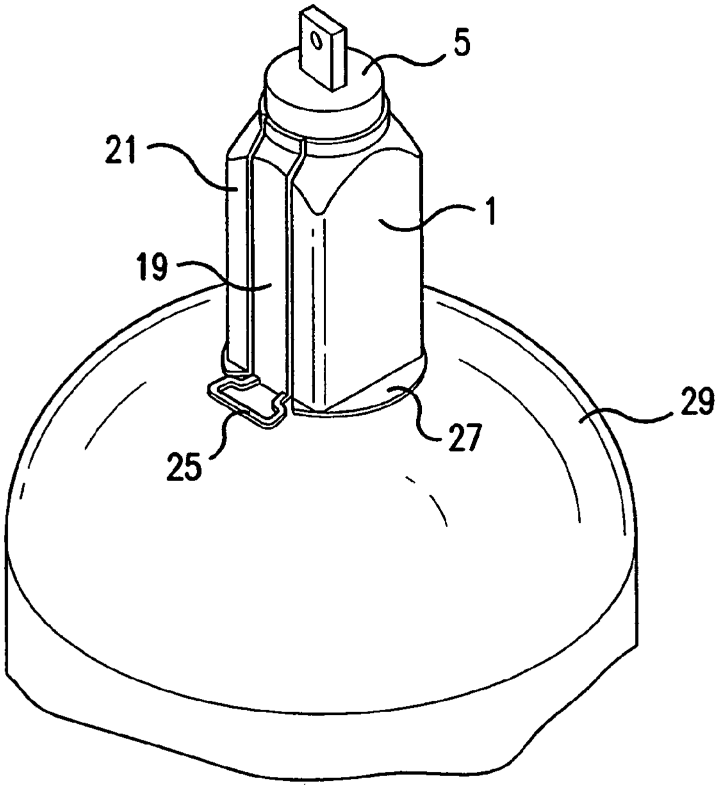
FIG. 1 is a view of the protective sleeve of the present invention installed in protective position over a gas valve of a gas bottle.

The invention will be described in connection with the FIGS. 1-24.

As shown in FIGS. 1-4, the present invention comprises a protective sleeve 1 for use in connection with valve stems for gas bottles 29. The protective sleeve 1 is comprised of an elongated body 3 of such length as to extend along at least a portion of the length of the valve stem 5.

The cross-sectional dimension of the protective sleeve should be such that the sleeve snugly engages the valve stem to enhance the protective aspect of the sleeve, and particularly to enhance the engagement of the protective sleeve with the valve stem in the manner discussed below.

The protective sleeve includes a locking mechanism to inhibit or prevent removal of the protective sleeve from the valve stem when placed thereover. The locking mechanism may, for example, comprise a ratchet-type projection 7 extending from an interior surface 9 of the protective sleeve which is adapted to physically engage with an orifice 11 in an opposing surface 13 of the valve stem. When so engaged, the protective sleeve is prevented from being removed from the valve stem upon being placed thereover due to engagement of said projection 7 with the orifice 11. The locking projection may be of any suitable cross-sectional configuration.

Figure 3:
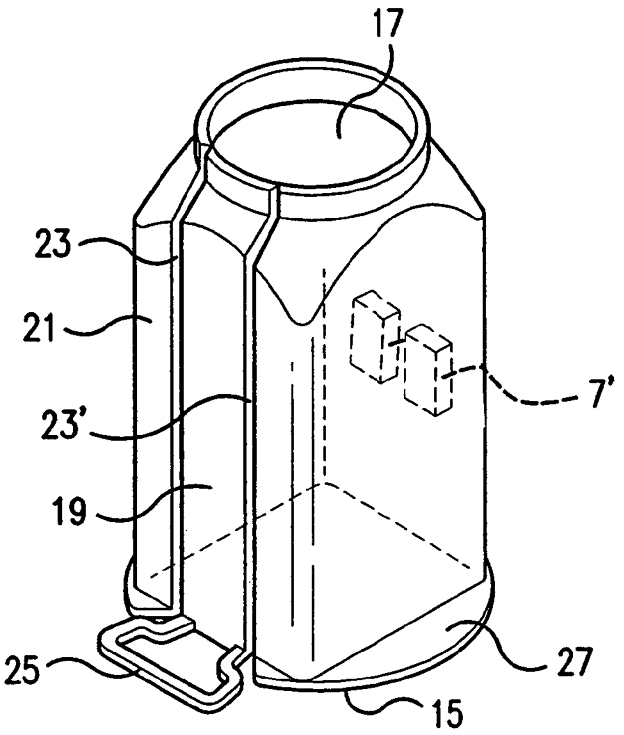
FIG. 3 is a view of one embodiment of the protective sleeve of the present invention.

However, while the cross-sectional configuration of the projection is not critical, the cross-sectional configuration is preferably configured to fit snugly within the orifice in the valve stem. Multiple projections may be provided to the extent that additional locking with a corresponding orifice is provided and/or believed necessary as shown in FIG. 3. The only requirement is that the projections be sized and located so that they engage with facing orifice(s) on the side of the gas valve stem.

Figure 2A:
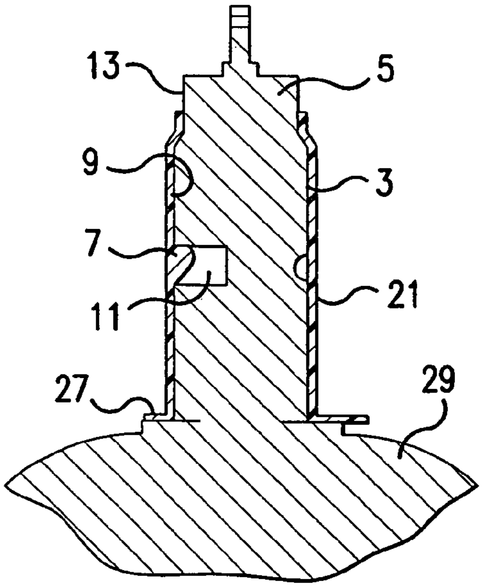
FIG. 2A is a cross-sectional view of the protective sleeve of FIG. 1.
Figure 2B:
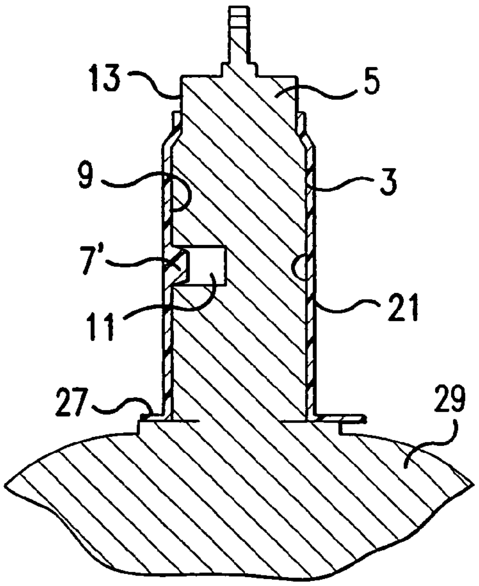
FIG. 2B is a cross-sectional view of another embodiment of the protective sleeve of FIG. 1.

The protective sleeve is preferably open-ended at each end. As shown in FIGS. 2A and 2B, the sleeve has an open end 15 adjacent the gas bottle, and an open end 17 through which the end of the valve stem extends.

In order to assist in the locking of the projection in the orifice, the projection is shown in FIG. 2A as having a shoulder at one end thereof and ramp at the other end thereof. The shoulder serves to lock against an interior surface of an orifice, while the ramp serves to facilitate placing the sleeve in locking engagement with the valve stem. Alternatively, as shown in FIG. 2B, each end of the projection may include a shoulder to lock against adjacent sides of the orifice. In each instance, the dimension of the projection is preferably sized to fit snugly within the orifice.

The protective sleeve also includes a tear strip 19 positioned along a side 21 of the protective sleeve. A portion of the protective sleeve may thus be removed by tearing so as to permit disengagement and removal of the protective sleeve from the valve stem.

Figure 4:
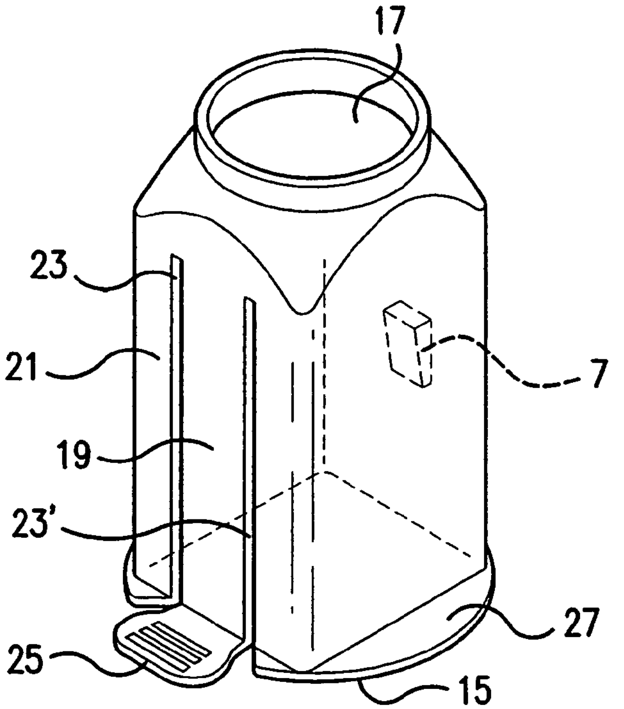
FIG. 4 is a view of another embodiment of the protective sleeve of the present invention.

The tear strip extends longitudinally along at least a portion of a side 21 of the protective sleeve, and is defined laterally by opposing tear lines 23, 23' formed in a side of the protective sleeve. The tear lines preferably extend along the entire longitudinal extent of the protective sleeve as shown in FIG. 3, but are not required to do so as shown in FIG. 4. The tear lines need only extend along a portion of a side of the protective sleeve to an extent sufficient to permit disengagement of the sleeve from the valve stem. The opposing tear lines are preferably parallel, and between which form the requisite tear strip.

In order to enhance the ease by which the tear strip may be torn and removed, a grip member 25 is preferably provided which is attached to a portion of the tear strip to facilitate tearing of the tear strip. The configuration of the grip member is not critical, and different configurations may be used as shown in FIGS. 3 and 4.

The protective sleeve preferably includes at least one flange member(s) extending laterally outwardly from the side of the protective sleeve. The flange members 27 assist in installation of the protective sleeve onto the gas valve stem by providing finger/thumb support as the sides of the protective sleeve are gripped and the protective sleeve pushed onto the gas valve stem. Desirably, the respective flanges are discontinuous—i.e., a single rim or peripheral flange extending around the body of the protective sleeve is not preferred, and not as advantageous as the use of discontinuous flange(s) which separately extend from one or more sides of the sleeve body.

Given the four-sided configuration of the protective sleeve to be placed in mating relationship with a four-sided valve stem (such as a CGA 870 medical oxygen post), one or more discontinuous flanges may be provided which extend from separate sides of the protective sleeve. Generally, no more than three flanges would be provided, in order to leave one side available for the tear strip and grip member. However, the side with the tear strip may have also have a flange as long as the tear strip extends across the flange to the grip member, so that the tear strip may tear across the flange when the grip member is moved.

In a preferred embodiment, only two flanges are provided, with the flanges being on opposing side surfaces of the protective sleeve (FIGS. 5, 6, 11-14, 17-21). An intermediate or connecting side surface would have the tear strip and associated grip member. The at least one projection would then preferably be on the side wall opposing the side wall having the tear strip, although it is also possible for the projection to be located on the same side wall as the tear strip such that it can be removed from engagement with an orifice of the valve stem as the tear strip is torn away. It is, of course, possible for the projection to be located on the interior of any side surface of the protective sleeve, as long as the tearing of the tear strip will serve to disengage the projection(s) from engagement with an associated orifice(s) in the side of the valve stem.

It has been found that the use of only two flanges (FIGS. 5, 6, 11-14, 17-21) assists in the ability of the installer to flex outwardly the side wall of the protective sleeve having the projection thereon upon squeezing of the sleeve between the installer's thumb and forefinger, which assists in pushing the projection over the valve stem when the protective sleeve is pushed over the valve stem. As the opposing sides of the protective sleeve having the flanges are stabilized by the presence of the flanges, the opposing sides with the flanges are inhibited from flexing outwardly, which encourages the intermediate sides not having a flange (but having at least one projection) to flex outwardly during installation as the protective sleeve is squeezed between a finger and thumb. This assists in installation by raising the projection(s) over the adjacent side surface of the valve stem when being pushed onto the valve stem due to the flexing outwardly of the two sides intermediate the two sides having a discontinuous flange. Such an advantage is not attained upon use of a continuous flange that extends entirely around the protective sleeve, or when three flanges are used.

A single flange may be used as shown in FIGS. 7-10, 15, 16, 22-24. However, in such an instance, the flange would preferably be opposite to the side of the protective sleeve having the finger grip and tear strip. This is for the reason that the combination of the single flange and finger grip provide support for the thumb and finger of the installer while pushing the protective sleeve into position on the valve stem.

The at least one flange(s) may be positioned along any portion of the entire longitudinal extent of the protective sleeve. It is preferable to have the flange(s) located at the bottom of the protective sleeve for purposes of maximizing gripping during installation (while the thumb and finger push the protective sleeve down onto the valve stem, the remaining portion of the protective sleeve may be stabilized between and gripped by the thumb and finger). It is also preferred that, when placing the flange(s) along the longitudinal extent of the protective sleeve, sufficient room be retained along the longitudinal extent of the protective sleeve (or that the protective sleeve be of such length) for purposes of being held between the thumb and finger for purposes of stabilizing and gripping the protective sleeve during installation. That is, sufficient length should preferably be provided between the flange and the top end of the protective sleeve to permit gripping of the sleeve between the thumb and forefinger without having the thumb or forefinger contact the adjacent surfaces of the valve stem upon pushing the sleeve into engagement with the valve stem.

Some protective devices provide accompanying means to carry/store a washer for use when connecting the gas bottle.

Figure 5:
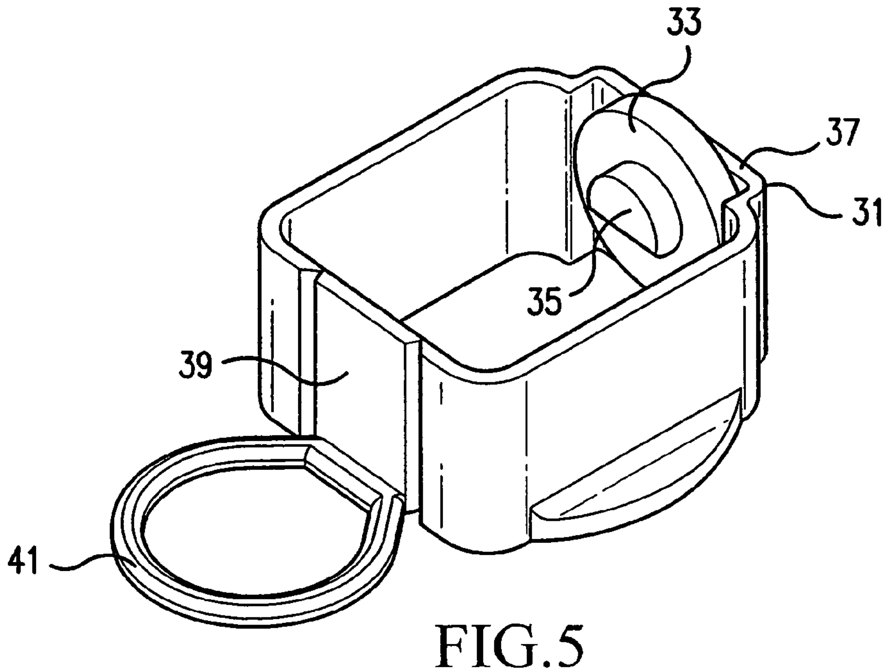
FIG. 5 is a view in perspective of the interior of the protective sleeve of the present invention which depicts the washer housing and a washer mounted therein.

FIG. 5 depicts the interior of a typical protective sleeve (with only the bottom portion of the protective sleeve shown in the drawing to permit better viewing of the interior of the sleeve) having a housing 31 for storage of a washer 33 which may be used by the user of a gas bottle. The housing is integrally molded into one of the walls of the protective sleeve, with the walls of the housing extending a short distance outwardly from the protective sleeve a distance sufficient to account for the thickness of the washer 33. The central hole of the washer is engaged with a protrusion 35 extending inwardly from a wall 37 of the housing to permit storage of the washer within the housing. The protrusion 35 may also serve to lockingly engage an orifice in the valve stem upon placement of the protective sleeve onto the valve stem if of sufficient length, although it is not required to do so. For instance, the washer housing may include a protrusion whose sole function is to engage the washer, with the protective sleeve including another projection which serves to lockingly engage an orifice in the valve stem.

Once the at least one tear strip 39 of the protective housing is removed by application of force to ring tab 41, and the protective sleeve removed from the gas bottle, the user is able to access the washer 33 and use it when attaching the regulator to the valve of the gas bottle. Such an arrangement thus encourages the user to always use a fresh washer when engaging the regulator and the gas bottle, as the washer is always easily at hand.

Figure 6:
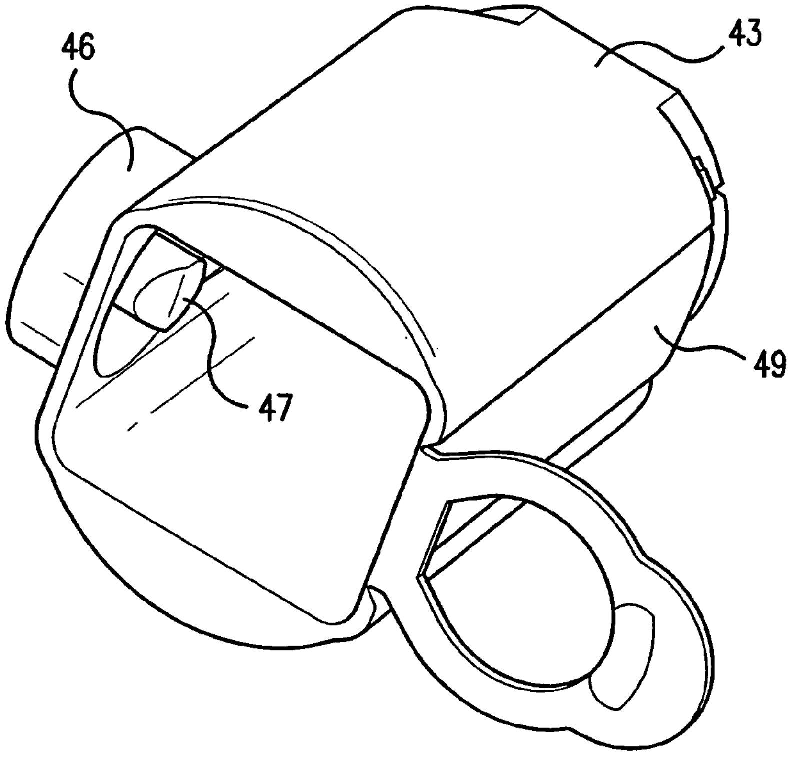
FIG. 6 is a view in perspective of the interior of the protective sleeve of the present invention which depicts another embodiment of the washing housing.
Figure 7:
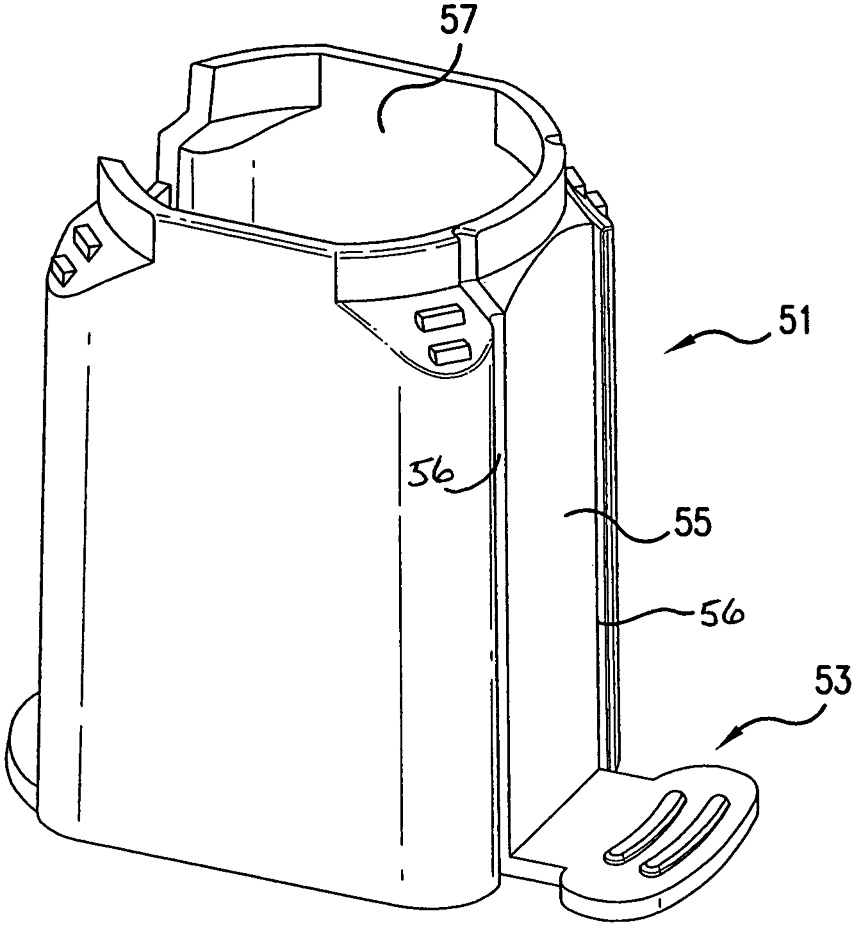
FIG. 7 is a view in perspective of another embodiment of the protective sleeve of the present invention.
Figure 8:
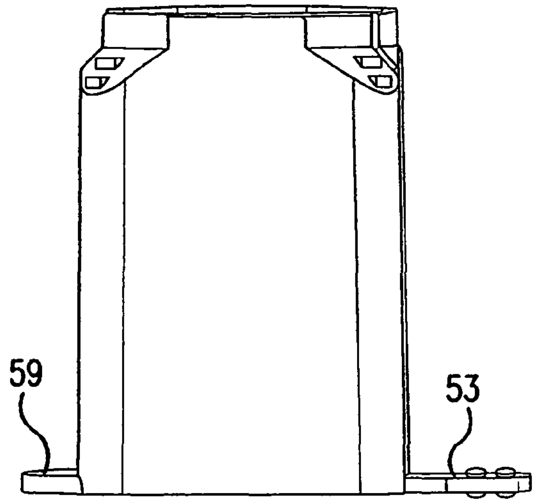
FIG. 8 is a side view of the embodiment of the protective sleeve of FIG. 7.
Figure 9:
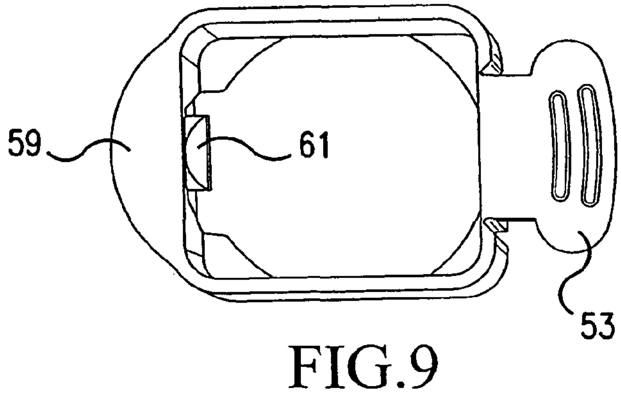
FIG. 9 is a bottom view of the embodiment of the protective sleeve of FIG. 7.
Figure 10:
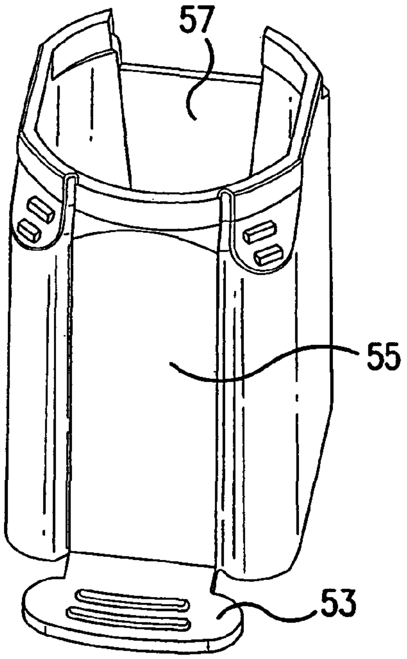
FIG. 10 is another view in perspective of the protective sleeve of FIG. 7.

FIG. 6 depicts another embodiment of the washer housing for use with the protective sleeve of the present invention. The Figure depicts a view from the bottom of a protective sleeve 43 according to the present invention having a housing 46 for storage of a washer (not shown) which may be used by the user of a gas bottle. The housing 46 is integrally molded into the walls of the protective sleeve 43, with the walls of the housing extending a short distance outwardly from the protective sleeve a distance sufficient to account for the thickness of the washer. The central hole of the washer is engaged with a protrusion 47 extending inwardly from an innermost surface of the housing 46 to permit storage of the washer within the housing. The protrusion 47 also serves to lockingly engage an orifice in the valve stem of the gas bottle upon placement of the protective sleeve upon the valve stem.

Once the at least one tear strip 49 of the protective housing is removed, and the protective sleeve removed from the gas bottle, the user is able to access the washer and remove the washer from engagement with protrusion 47 and use it when attaching the regulator to the valve of the gas bottle. Such an arrangement thus encourages the user to always use a fresh washer when engaging the regulator and the gas bottle, as the washer is always easily at hand.

FIGS. 7-10 depict yet another embodiment of the present invention. The protective sleeve 51 of FIGS. 7-10 has a pull tab 53 attached to the bottom of tear strip 55 in one of the sides of the protective sleeve defined by tear lines 56. Flange 59 extends from the bottom of the sleeve body opposite from the pull tab 53. In use, the protective sleeve 51 is placed over the gas bottle valve stem, with the valve stem extending from the top 57 of the protective sleeve. Protrusion 61 lockingly engages with an orifice in the gas bottle valve stem to lock the protective sleeve in place on the valve stem.

FIG. 11-18 depict alternate embodiments of the protective sleeve of the present invention having different types of washer housings.

Figure 11:
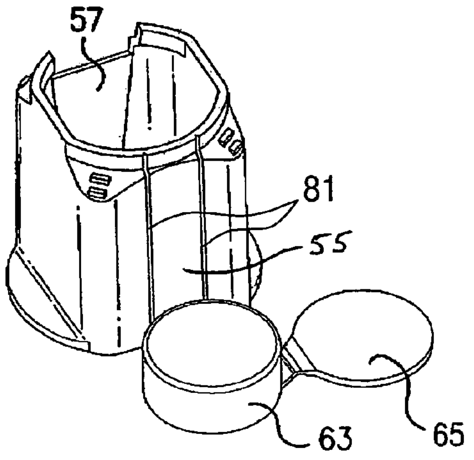
FIGS. 11-18 are additional embodiments of the protective sleeve of the present invention having different washer storage housings.
Figure 12:
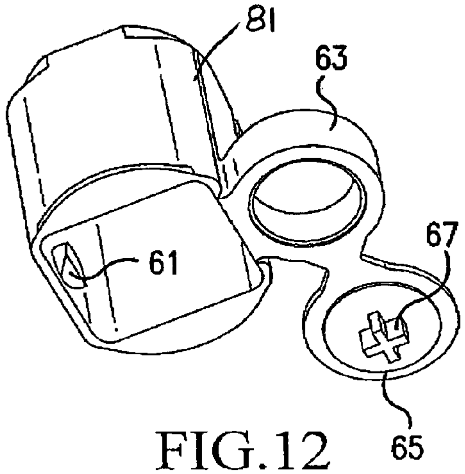

FIGS. 11 and 12 depict a protective sleeves having a top portion 57, and washer housing 63 attached to one bottom side portion of the protective sleeve. The washer housing includes a base portion 63 and a hinged top of the base 65 containing a hub 67 upon which the washer (not shown) is placed for storage. The washer housing as shown is attached to the tear strip 55 on the side of the protective sleeve housing, and can be used to tear the tear strip along tear lines 81. The washer housing is shown to have the opening at the bottom of the housing. However, the opening may be at the top of the housing instead of the bottom with no disadvantage.

Figure 13:
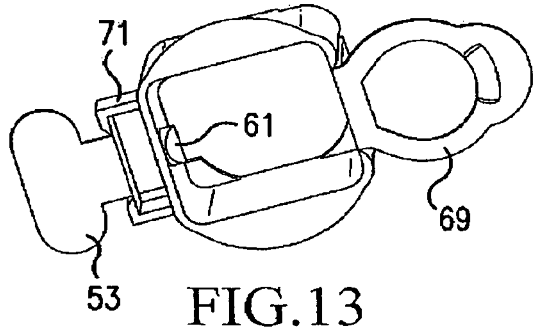
Figure 14:
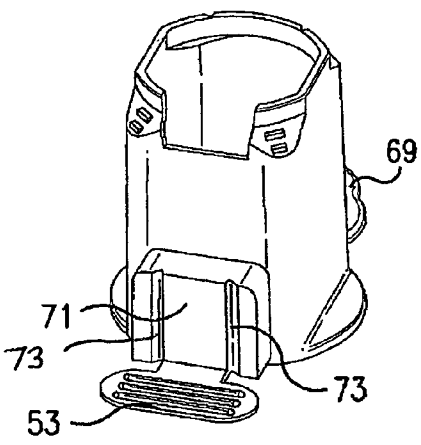

FIGS. 13 and 14 depict a protective sleeve having finger grips 53 and 69, two flanges, and housing 71 for storage of a washer. The housing 71 includes two tear lines 73 which, upon being torn, expose the washer placed inside. The interior of the sleeve includes protrusion 61.

Figure 15:
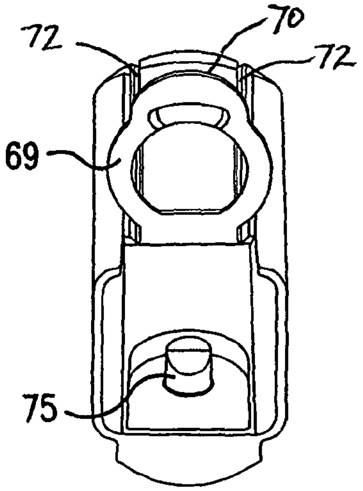
Figure 16:
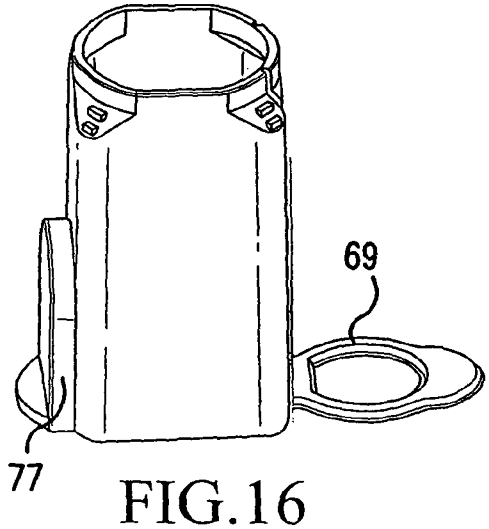

FIGS. 15 and 16 depict a protective sleeve having a protrusion 75 upon which the washer may be placed within housing 77, a single flange, and ring tab 69 attached to tear strip 70 defined by tear lines 72 as previously discussed.

Figure 17:
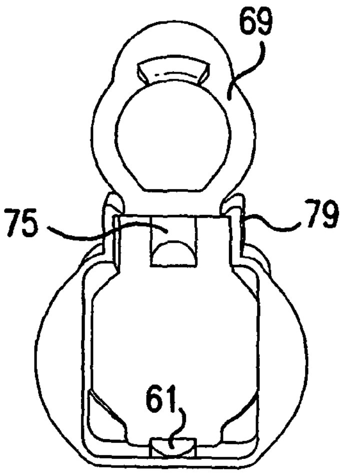
Figure 18:
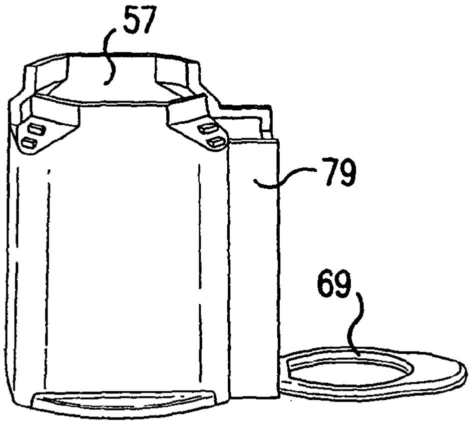

FIGS. 17 and 18 depict a protective sleeve having a top opening 57, projection 61 adapted to engage an orifice in the valve stem, and protrusion 75 adapted to store a washer thereon within housing 79. Ring tab 69 is attached to a tear strip (not shown) on the side of the housing 79. Upon removal of the tear strip, the washer may be removed and the protective sleeve removed from engagement with the valve stem.

Figure 19:
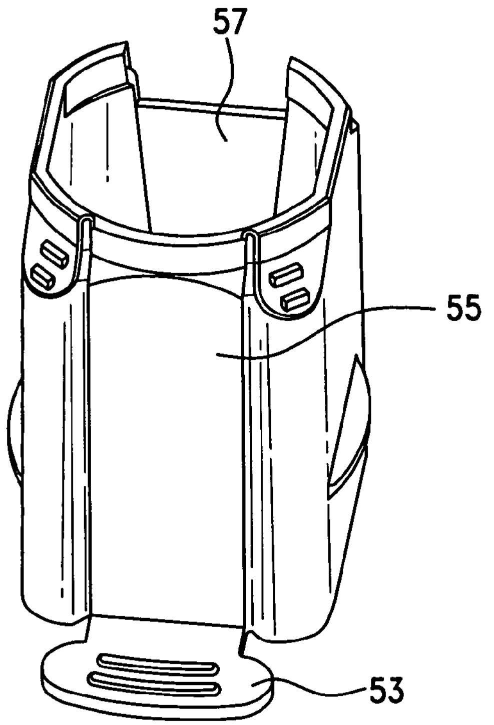
FIGS. 19-21 are additional embodiments of the protective sleeve of the present invention having two flanges.
Figure 20:
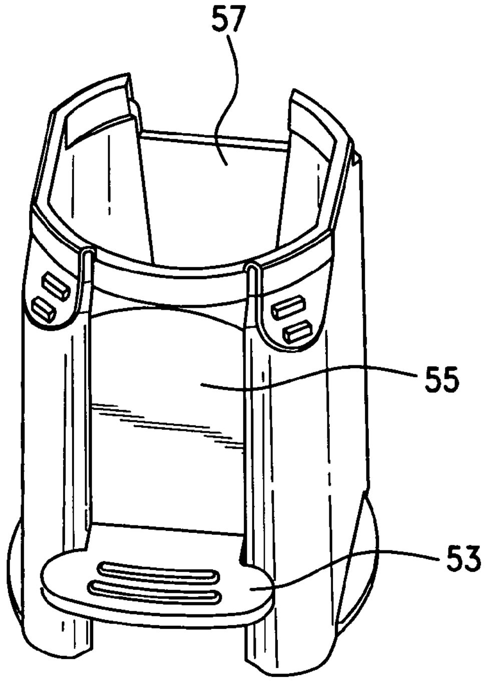
Figure 21:
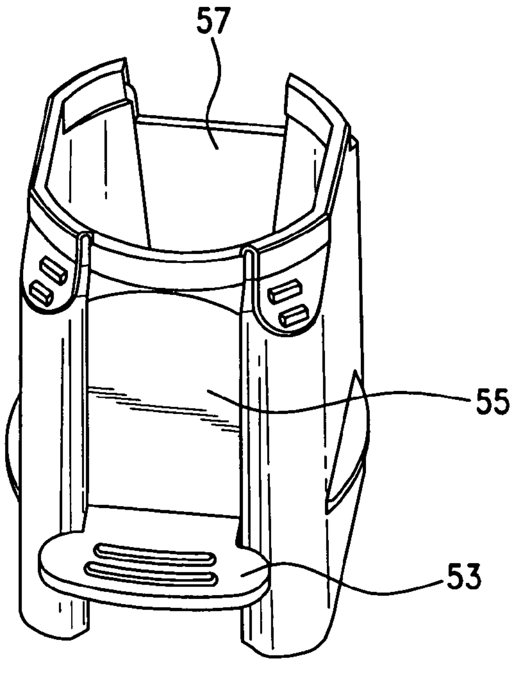

FIGS. 19-21 depict the an embodiment of the protective sleeve of the present invention having only two flanges on opposing side walls of the sleeve body. The Figures depict the flanges and the finger grip member 53 being located at different points along the length of the sleeve body. FIG. 19 depicts the finger grip being located at the bottom of the protective sleeve, with the two flanges being located between the ends of the sleeve. FIG. 20 depicts the two flanges being located at the bottom of the sleeve body, and the finger grip being located between the ends of the sleeve. FIG. 21 depicts both the two flanges and the finger grip being located at a point between the two ends.

Figure 22:
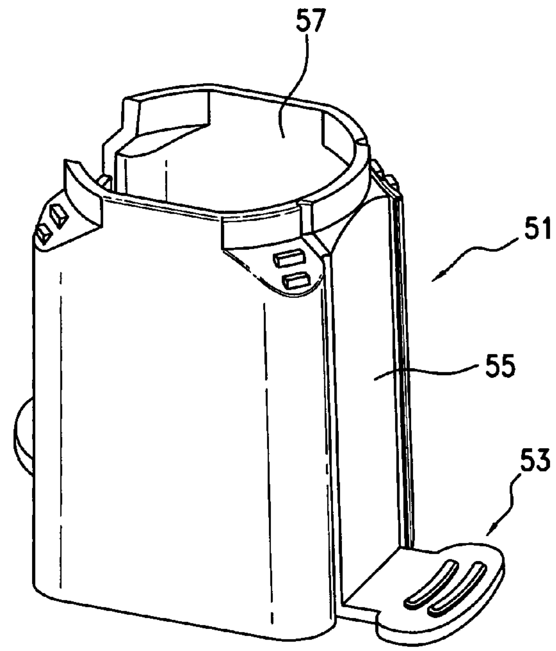
FIGS. 22-24 are additional embodiments of the protective sleeve of the present invention having a single flange.
Figure 23:
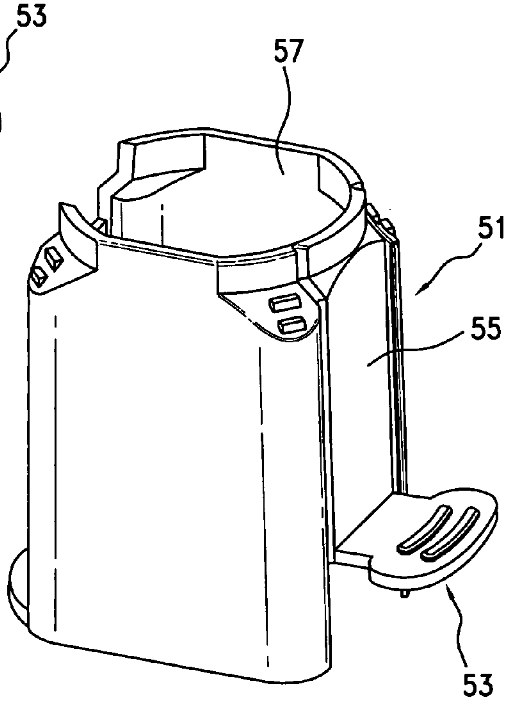
Figure 24:
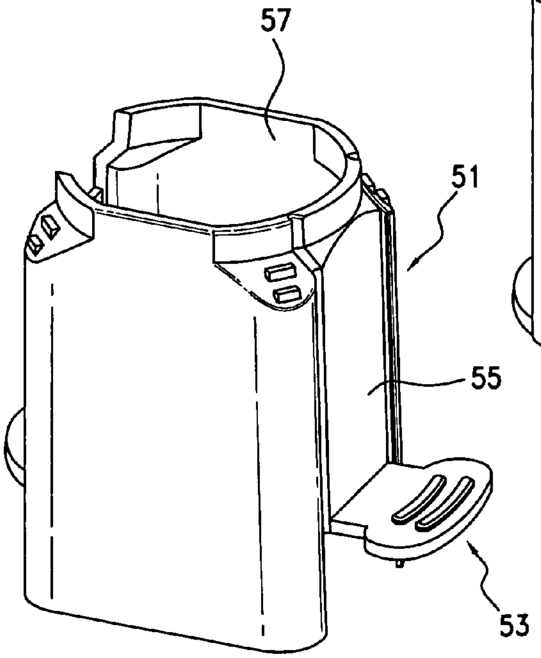

FIGS. 22-24 depict the an embodiment of the protective sleeve of the present invention having only a single flange on a side wall of the sleeve body opposite the side wall having the finger grip member. The Figures depict the flange and the finger grip member 53 being located at different points along the length of the sleeve body. FIG. 22 depicts the finger grip being located at the bottom of the protective sleeve, with the flange being located between the ends of the sleeve. FIG. 23 depicts the flange being located at the bottom of the sleeve body, and the finger grip being located between the ends of the sleeve. FIG. 24 depicts both the flange and the finger grip being located at a point between the two ends. It is desirable in such an instance for the flange and the finger grip to be located at the same point along the sleeve body to facilitate use of both when pushing the sleeve onto the gas valve. Of course, it is also possible for one or more of the finger grip or the flange to be located at the top end of the protective sleeve. However, such an embodiment would be more cumbersome to use, and hence less desirable.

The protective sleeve may be formed of any suitable material which enables the protective sleeve to function in the manner discussed above. The protective sleeve is preferably comprised of a plastic resin material suitable for molding a unitary molded sleeve body (such as by injection molding), and once formed, is sufficiently flexible to be placed over the valve stem and into engagement therewith, and sufficiently inflexible to remain engaged therewith absent removal of the tear strip. The protective sleeve may be comprised of a variety of plastic resin materials, such as low density polyethylene or filled flexible polyvinyl chloride. It is desirable for the sleeve body to be prepared from a plastic resin material which, once molded, is not entirely opaque, but permits viewing of the exterior of the gas valve stem. The selection of such materials and the molding method by which the sleeve may be formed are well known to those of ordinary skill in the art.

What is claimed is:

1. A protective device for use in connection with a four-sided valve body for gas bottles, said valve body having a gas port, said protective device comprised of:

a unitary molded tubular body comprising four sides and having opposite open ends, at least one projection extending from an interior surface of said protective device adapted to physically engage with a portion of an opposing surface of said valve body, whereby said protective device is prevented from being easily removed from said valve body upon being placed over an end of said valve body due to engagement of said at least one projection with said portion of said opposing surface of said valve body, said tubular body having such size and configuration such that the sides of said tubular body are each adjacent to a corresponding portion of an opposing side of said valve body, with a portion of one of said sides of said tubular body covering said gas port in said valve body, when said protective device is placed over said valve body in engagement therewith, at least one tear strip provided within at least a portion of at least one side surface of said protective device, whereby tearing said tear strip permits disengagement and removal of said protective device from said valve body, a grip member attached to a portion of said tear strip to facilitate tearing of said tear strip, and wherein said device includes two flanges extending laterally outwardly from opposite sides of said device.

2. The protective device of claim 1, wherein said tear strip extends longitudinally along a portion of a side of said protective device, and is defined laterally by parallel tear lines formed in said side of said protective device.

3. The protective device of claim 2, wherein said tear lines extend along a longitudinal extent of said protective device.

4. The protective device of claim 1, comprised of a moldable plastic resin material.

5. The protective device of claim 1, wherein multiple projections are present for engagement in multiple portions of said valve body.

6. The protective device of claim 1, wherein said at least one projection includes a shoulder portion that lockingly engages a portion of said opposing surface to inhibit removal of said protective device from said valve body.

7. The protective device of claim 1, further including a housing for storage of a washer.

8. The protective device of claim 7, wherein said at least one projection is located in said washer housing and also serves to engage a washer to retain same in said housing.

9. The protective device of claim 7, wherein said housing for storage of said washer has a portion adapted to physically engage with an interior hole of said washer to hold said washer in place within said housing.

10. The protective device of claim 7, wherein said housing for storage of said washer has a portion adapted to physically engage with an interior hole of said washer to hold said washer in place within said housing.

11. The protective device of claim 1, wherein said flanges are arcuate in configuration.

12. The protective device of claim 1, wherein said opposing sides are adjacent to a side from which said grip member extends, and wherein a side from whose interior surface said projection resides is opposite to said side having said tear strip.

13. The protective device of claim 1, wherein said opposing sides are adjacent to a side from which said grip member extends, and wherein said projection resides on the same side having said tear strip.

14. The protective device of claim 1, wherein said flanges are located at the bottom of said protective device.

15. The protective device of claim 1, wherein said flanges are located at a position intermediate the top and bottom of said protective device.

16. The protective device of claim 1, wherein said grip member is located at the bottom of said protective device, and said flanges are located at the bottom of said protective device.

17. The protective device of claim 1, wherein said grip member is located at the bottom of said protective device, and said flanges are located at a position intermediate the top and bottom of said protective device.

18. The protective device of claim 1, wherein said grip member is located at a position intermediate the top and bottom of said protective device, and said flanges are located at the bottom of said protective device.

19. The protective device of claim 1, wherein both said grip member and said flanges are located at a position intermediate the top and bottom of said protective device.

20. A protective device for use in connection with a valve body for gas bottles, said valve body having a gas port, said protective device comprised of:

a unitary molded body having opposite open ends, at least one projection extending from an interior surface of a side of said protective device and adapted to physically engage with said gas port in an opposing surface of said valve body in locking engagement whereby said protective device is prevented from being easily removed from said valve body upon being placed over an end of said valve body due to engagement of said projection with said gas port, said body having such size and configuration such that the sides of said body are each adjacent to a corresponding portion of an opposing side of said valve body, with a portion of one of said sides of said body covering said gas port in said valve body, when said protective device is placed over said valve body in engagement therewith, at least one tear strip provided within at least a portion of at least one side surface of said protective device, whereby tearing said tear strip permits disengagement and removal of said protective device from said valve body, and a grip member attached to a portion of said tear strip to facilitate tearing of said tear strip, wherein said device includes two flanges extending laterally outwardly from opposite sides of said device.

21. The protective device of claim 20, wherein said tear strip extends longitudinally along a portion of a side of said protective device.

22. The protective device of claim 21, wherein said tear strip is defined by tear lines which extend along a longitudinal extent of said protective device.

23. The protective device of claim 20, comprised of a plastic resin material.

24. The protective device of claim 20, wherein multiple projections are present for engagement in multiple portions of an opposing surface in said valve body.

25. The protective device of claim 20, wherein said at least one projection includes a shoulder portion that lockingly engages an adjacent portion of said opposing surface of said valve body to inhibit removal of said protective device from said valve body.

26. The protective device of claim 20, wherein said device includes a housing for storage of a washer.

27. The protective device of claim 20, wherein said tear strip and said projection reside on opposite sides of said protective device.

28. The protective device of claim 1, wherein said flanges extend laterally outwardly from said tubular body and are configured to engage a thumb or finger of the user to assist in placing the protective device upon the valve body of the gas cylinder by application of downward force.

29. The protective device of claim 20, wherein said unitary molded body has four sides.

30. A protective device for use in connection with a four-sided valve body for gas bottles, said valve body having a gas port, said protective device comprised of:

a unitary molded tubular body comprising four sides and having opposite open ends, at least one projection extending from an interior surface of said protective device adapted to physically engage with a portion of an opposing surface of said valve body, whereby said protective device is prevented from being easily removed from said valve body upon being placed over an end of said valve body whereby said at least one projection is moved into engagement with said portion of said opposing surface of said valve body, said tubular body having such size and configuration such that the sides of said tubular body are each adjacent to a corresponding portion of an opposing side of said valve body, with a portion of one of said sides of said tubular body covering said gas port in said valve body, when said protective device is placed over said valve body into engagement therewith, at least one tear strip provided within at least a portion of at least one side surface of said protective device, whereby tearing said tear strip permits disengagement and removal of said protective device from said valve body, a grip member attached to a portion of said tear strip to facilitate tearing of said tear strip, and at least one flange extending laterally outwardly from said tubular body, wherein said at least one flange is located at a position intermediate the top and bottom of said protective device.

31. The protective device of claim 30, wherein said grip member is located at the bottom of said protective device.

32. The protective device of claim 30, wherein both said grip member and said at least one flange are located at a position intermediate the top and bottom of said protective device.

33. The protective device of claim 30, wherein a single flange extends from a side opposite to a side from which said finger grip extends.

34. The protective device of claim 30, wherein multiple flanges are present.

35. A protective device for use in connection with a four-sided valve body for gas bottles, said valve body having a gas port, said protective device comprised of:

a unitary molded tubular body comprising four sides and having opposite open ends, at least one projection extending from an interior surface of said protective device adapted to physically engage with a portion of an opposing surface of said valve body, whereby said protective device is prevented from being easily removed from said valve body upon being placed over an end of said valve body and moved into engagement with said at least one projection within said portion of said opposing surface of said valve body, said tubular body having such size and configuration such that the sides of said tubular body are each adjacent to a corresponding portion of an opposing side of said valve body, with a portion of one of said sides of said tubular body covering said gas port in said valve body, when said protective device is placed over said valve body into engagement therewith, at least one tear strip provided within at least a portion of at least one side surface of said protective device, whereby tearing said tear strip permits disengagement and removal of said protective device from said valve body, a grip member attached to a portion of said tear strip to facilitate tearing of said tear strip, and wherein a single flange is present on said tubular body and extends from a side opposite to a side from which said grip member extends.

36. The protective device of claim 35, wherein said tear strip extends longitudinally along a portion of a side of said protective device, and is defined laterally by parallel tear lines formed in said side of said protective device.

37. The protective device of claim 36, wherein said tear lines extend along a longitudinal extent of said protective device.

38. The protective device of claim 35, comprised of a moldable plastic resin material.

39. The protective device of claim 35, wherein multiple projections are present for engagement in multiple portions of said valve body.

40. The protective device of claim 35, wherein said at least one projection includes a shoulder portion that lockingly engages a portion of said opposing surface to inhibit removal of said protective device from said valve body.

41. The protective device of claim 35, further including a housing for storage of a washer.

42. The protective device of claim 41, wherein said at least one projection is located in said washer housing and also serves to engage a washer to retain same in said housing.

43. The protective device of claim 35, wherein said flange is arcuate in configuration.

44. A protective device for use in connection with a four-sided valve body for gas bottles, said valve body having a gas port, said protective device comprised of:

a unitary molded tubular body comprising four sides and having opposite open ends, at least one projection extending from an interior surface of said protective device adapted to physically engage with a portion of an opposing surface of said valve body, whereby said protective device is prevented from being easily removed from said valve body upon being placed over an end of said valve stem and moved into engagement of said at least one projection with said portion of said opposing surface of said valve body, said tubular body having such size and configuration such that the sides of said tubular body are each adjacent to a corresponding portion of an opposing side of said valve body, with a portion of one of said sides of said tubular body covering said gas port in said valve body, when said protective device is placed over said valve body into engagement therewith, at least one tear strip provided within at least a portion of at least one side surface of said protective device, whereby tearing said tear strip permits disengagement and removal of said protective device from said valve body, a grip member attached to a portion of said tear strip to facilitate tearing of said tear strip, and at least one flange extending laterally outwardly from said tubular body, wherein said device includes a housing for storage of a washer which extends along an outside wall of said protective device.

45. The protective device of claim 44, wherein said tear strip extends longitudinally along a portion of a side of said protective device, and is defined laterally by parallel tear lines formed in said side of said protective device.

46. The protective device of claim 45, wherein said tear lines extend along a longitudinal extent of said protective device.

47. The protective device of claim 44, comprised of a moldable plastic resin material.

48. The protective device of claim 44, wherein multiple projections are present for engagement in multiple portions of said valve body.

49. The protective device of claim 44, wherein said at least one projection includes a shoulder portion that lockingly engages a portion of said opposing surface to inhibit removal of said protective device from said valve body.

50. The protective device of claim 44, wherein said at least one flange is arcuate in configuration.

51. The protective device of claim 44, wherein said housing for storage of said washer has a portion adapted to physically engage with an interior hole of said washer to hold said washer in place within said housing.

52. The protective device of claim 44, wherein multiple flanges are present.

* * * * *